United States Patent
Hartwick

(10) Patent No.: US 7,410,140 B2
(45) Date of Patent: Aug. 12, 2008

(54) INDUSTRIAL HANGER

(75) Inventor: Sam K. Hartwick, Marsing, ID (US)

(73) Assignee: Illinois Tool Works Inc., Glenview, IL (US)

( * ) Notice: Subject to any disclaimer, the term of this patent is extended or adjusted under 35 U.S.C. 154(b) by 195 days.

(21) Appl. No.: 10/641,603

(22) Filed: Aug. 15, 2003

(65) Prior Publication Data

US 2005/0055945 A1    Mar. 17, 2005

(51) Int. Cl.
*A47H 1/10* (2006.01)
(52) U.S. Cl. .................... 248/317; 248/237; 52/707; 403/299; 411/392; 411/389; 362/457
(58) Field of Classification Search .................. 248/58, 248/317, 339, 340, 342, 343, 237; 411/392, 411/400, 389, 84, 85, 401; 362/457, 404, 362/406; 52/707, 706, 710, 704; 403/299, 403/300, 293, 296, 387
See application file for complete search history.

(56) References Cited

U.S. PATENT DOCUMENTS

| | | | | | |
|---|---|---|---|---|---|
| 1,145,385 | A | * | 7/1915 | Marble | 52/701 |
| 1,155,243 | A | * | 9/1915 | Jordahl | 52/710 |
| 1,360,200 | A | * | 11/1920 | Dowd | 411/342 |
| 1,837,930 | A | * | 12/1931 | Waite | 248/58 |
| 1,856,356 | A | * | 5/1932 | Owen | 174/63 |
| 1,941,211 | A | * | 12/1933 | Inglee | 52/326 |
| 2,632,620 | A | * | 3/1953 | Hurley | 248/343 |
| 4,080,712 | A | * | 3/1978 | Weber | 29/458 |
| 4,097,015 | A | * | 6/1978 | Frishman | 248/339 |
| 4,099,694 | A | * | 7/1978 | Horwitz | 248/339 |
| 4,127,252 | A | * | 11/1978 | Splawn | 248/333 |
| 4,416,095 | A | * | 11/1983 | Truluck | 52/506.07 |
| 4,544,119 | A | * | 10/1985 | Kellett et al. | 248/58 |
| 4,805,855 | A | * | 2/1989 | Kirby | 248/58 |
| 4,993,676 | A | * | 2/1991 | Fitts et al. | 248/317 |
| 5,085,393 | A | * | 2/1992 | Ryan | 248/343 |
| 5,154,579 | A | * | 10/1992 | Rezek | 416/5 |
| 5,351,926 | A | * | 10/1994 | Moses | 248/354.5 |
| 5,937,073 | A | * | 8/1999 | Van Gieson | 381/391 |
| 6,609,343 | B1 | * | 8/2003 | Litten | 52/653.2 |
| 2006/0254190 | A1 | * | 11/2006 | Hunt | 52/698 |

OTHER PUBLICATIONS

Unistrut Corporation; Unistrut Product Manual; 2002.

* cited by examiner

*Primary Examiner*—Kimberly Wood
(74) *Attorney, Agent, or Firm*—Mark W. Croll; Donald J. Breh; Levenfeld Pearlstein, LLC

(57) ABSTRACT

An industrial hanger assembly for attaching to a truss. The industrial hanger assembly includes a first member, a portion of which is operable to fit within a gap between the inner surface of a first angle iron and the inner surface of a second angle iron. The first member can contact the upper surface(s) of the first angle iron and/or the second angle iron. The first member can contact an outer surface(s) of the first angle iron and/or the second angle iron. The industrial hanger assembly also includes a second member that is coupled (directly or indirectly) to the first member. The first member can contact a lower surface(s) of the first angle iron and/or the second angle iron.

19 Claims, 8 Drawing Sheets

INDUSTRIAL HANGER

1. FIELD OF THE INVENTION

The present invention relates to industrial hangers.

2. BACKGROUND

Figure 1:
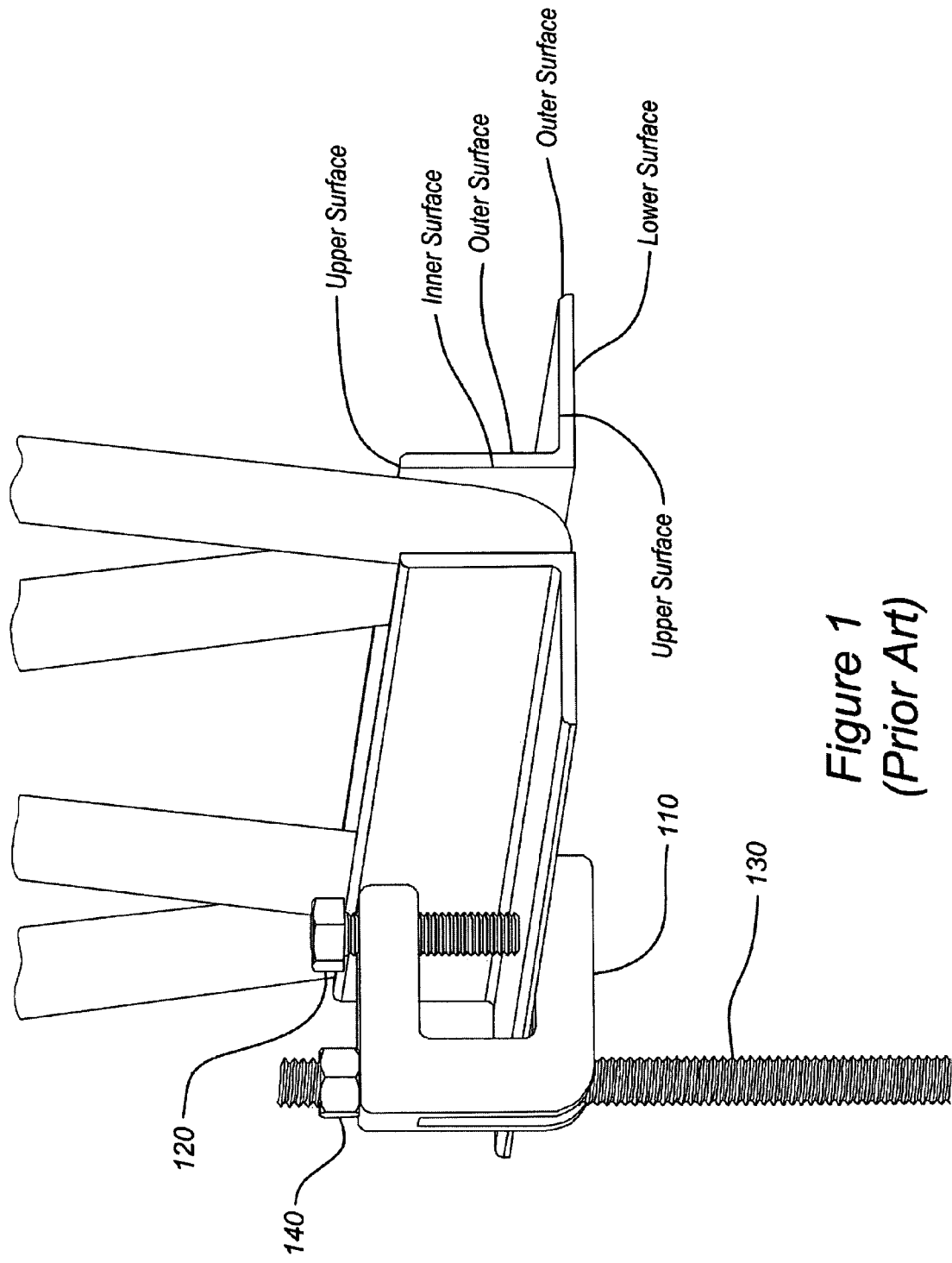

Many industrial buildings, such as warehouses, utilize trusses to support the roof of the buildings. The trusses are also utilized to support electrical lights, electrical conduits, and pipes of various sizes. Some of these trusses include two angle irons. As shown in FIG. 1, these angle irons each typically include two upper surfaces, a lower surface, an inner surface, and two outer surfaces. The inner surfaces of the two angle irons are attached to the webbing of the truss. As a result, along the inner surfaces of the two angle irons a number of gaps are formed.

One prior art industrial hanger assembly is shown in FIG. 1. As shown in FIG. 1, the prior art hanger 110 is clamped to a lower surface of an angle iron of a truss by a bolt 120. The prior art hanger 110 also supports an all-thread rod 130. The height of the all-thread rod 130 is adjusted by setting the position of a nut 140 with respect to the all-thread rod 130. Items such as conduit hangers are then attached to the all-thread rod 130.

One disadvantage of the above industrial hanger assembly is that the industrial hanger cannot be readily installed from the floor of an industrial building. Instead, the installer typically elevates himself, via a lift or a ladder, to the height of the truss so that he can manipulate the bolt 120 and install the prior art hanger. Sometimes obstructions, such as large electrical equipment, do not permit an installer to be readily elevated so that he can install the prior art hanger 110. In addition, hanger installation time would be reduced and safety would be enhanced if the installer could install an industrial hanger from the floor of an industrial building. Thus, a need exists for an industrial hanger that can be readily installed from the floor of an industrial building.

3. SUMMARY OF THE INVENTION

One embodiment of the invention is a hanger assembly for attaching to a truss. The hanger assembly includes a first member, a portion of which is operable to fit within a gap between the inner surface of a first angle iron and the inner surface of a second angle iron. The first member can contact the upper surface(s) of the first angle iron and/or the second angle iron. The first member can contact an outer surface(s) of the first angle iron and/or the second angle iron. The hanger assembly also includes a second member that is coupled (directly or indirectly) to the first member. The first member can contact a lower surface(s) of the first angle iron and/or the second angle iron.

4. BRIEF DESCRIPTION OF THE FIGURES

FIG. 1 presents a prior art industrial hanger assembly.

Figure 2:
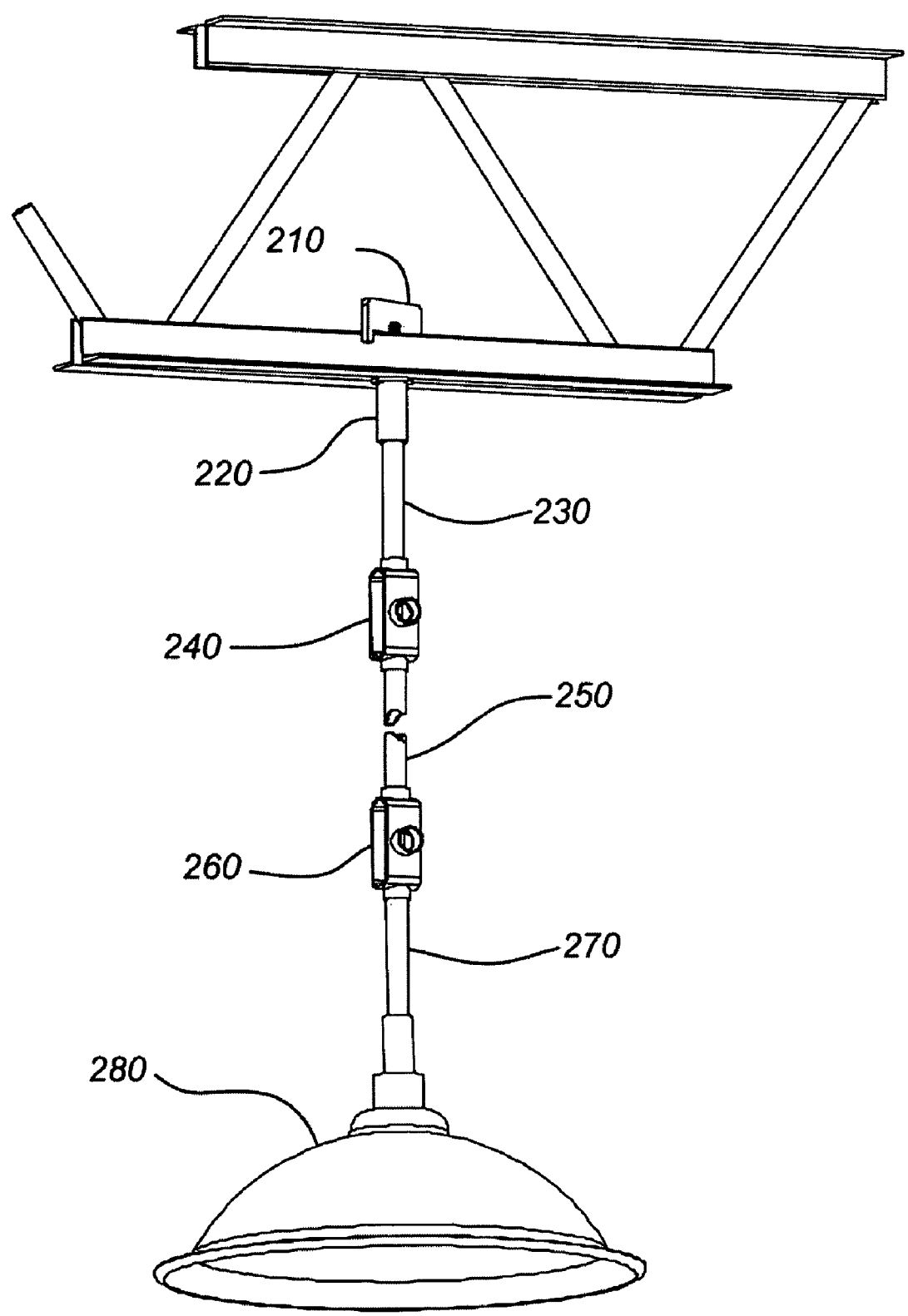

FIG. 2 presents an industrial hanger assembly.

Figure 3:
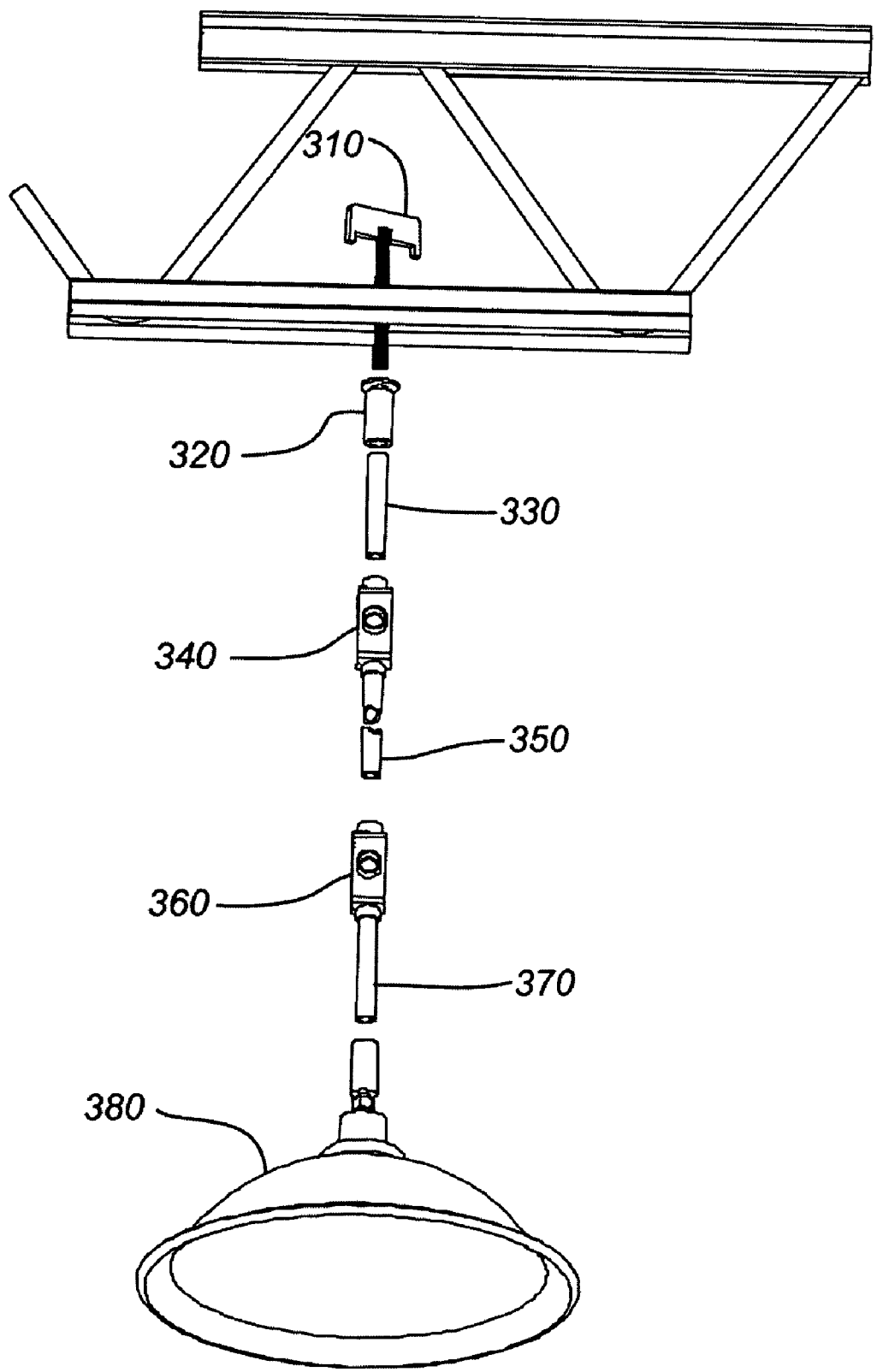

FIG. 3 presents an exploded view of the industrial hanger assembly of FIG. 2.

Figure 4:
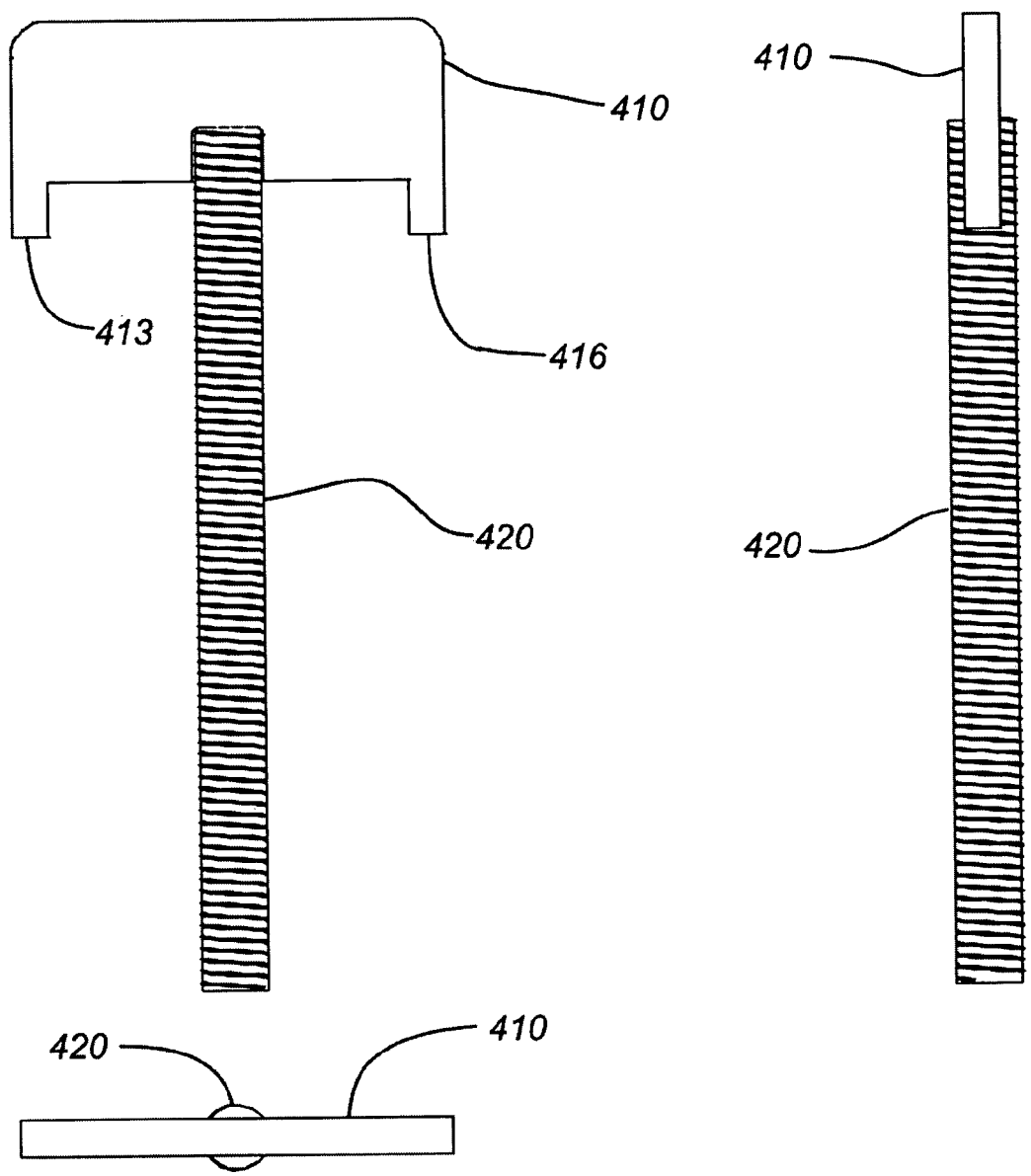

FIG. 4 presents a detailed view of a T-bar assembly.

Figure 5:
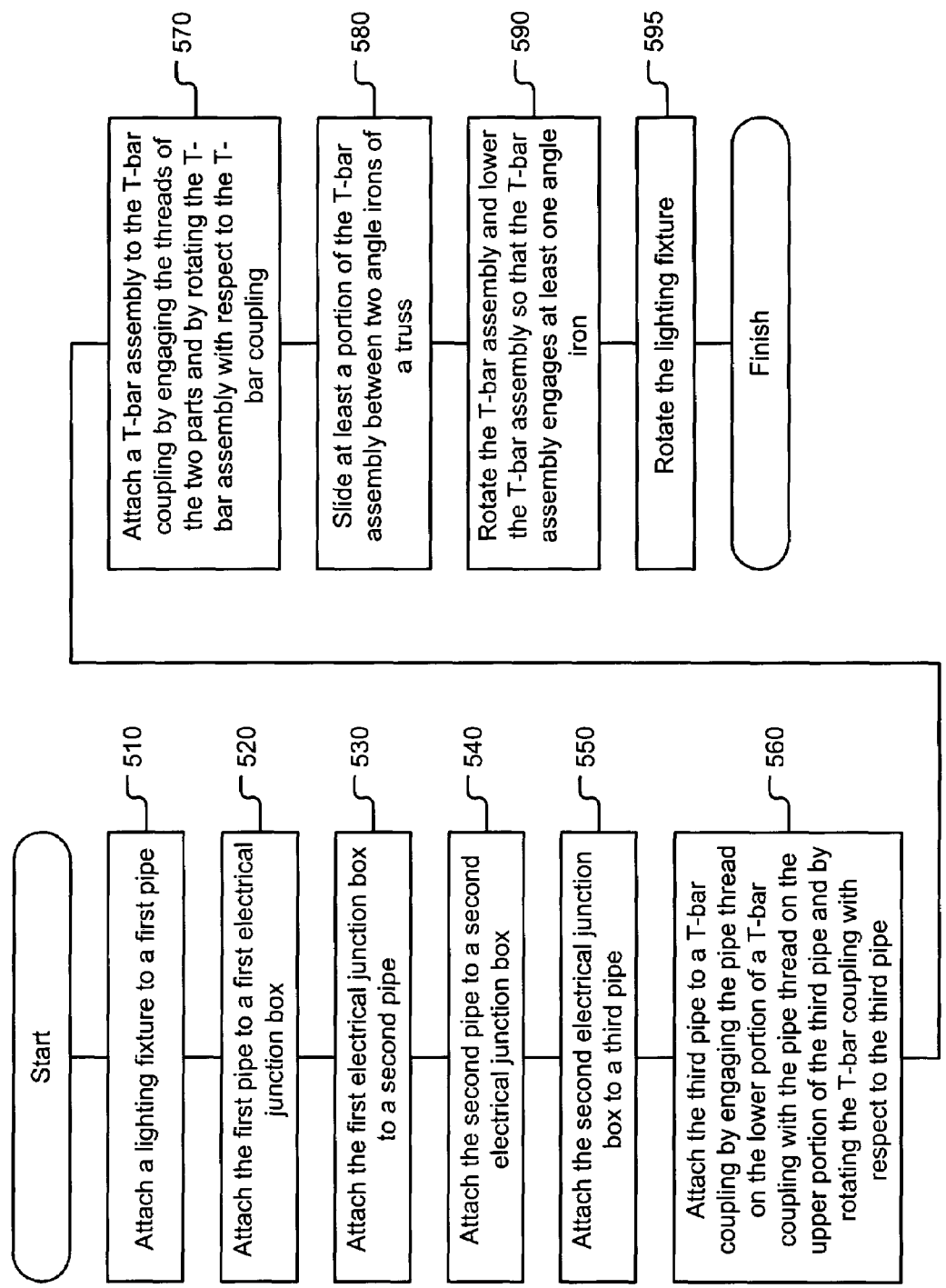

FIG. 5 presents a method of installing a hanger assembly onto a truss.

Figure 6:
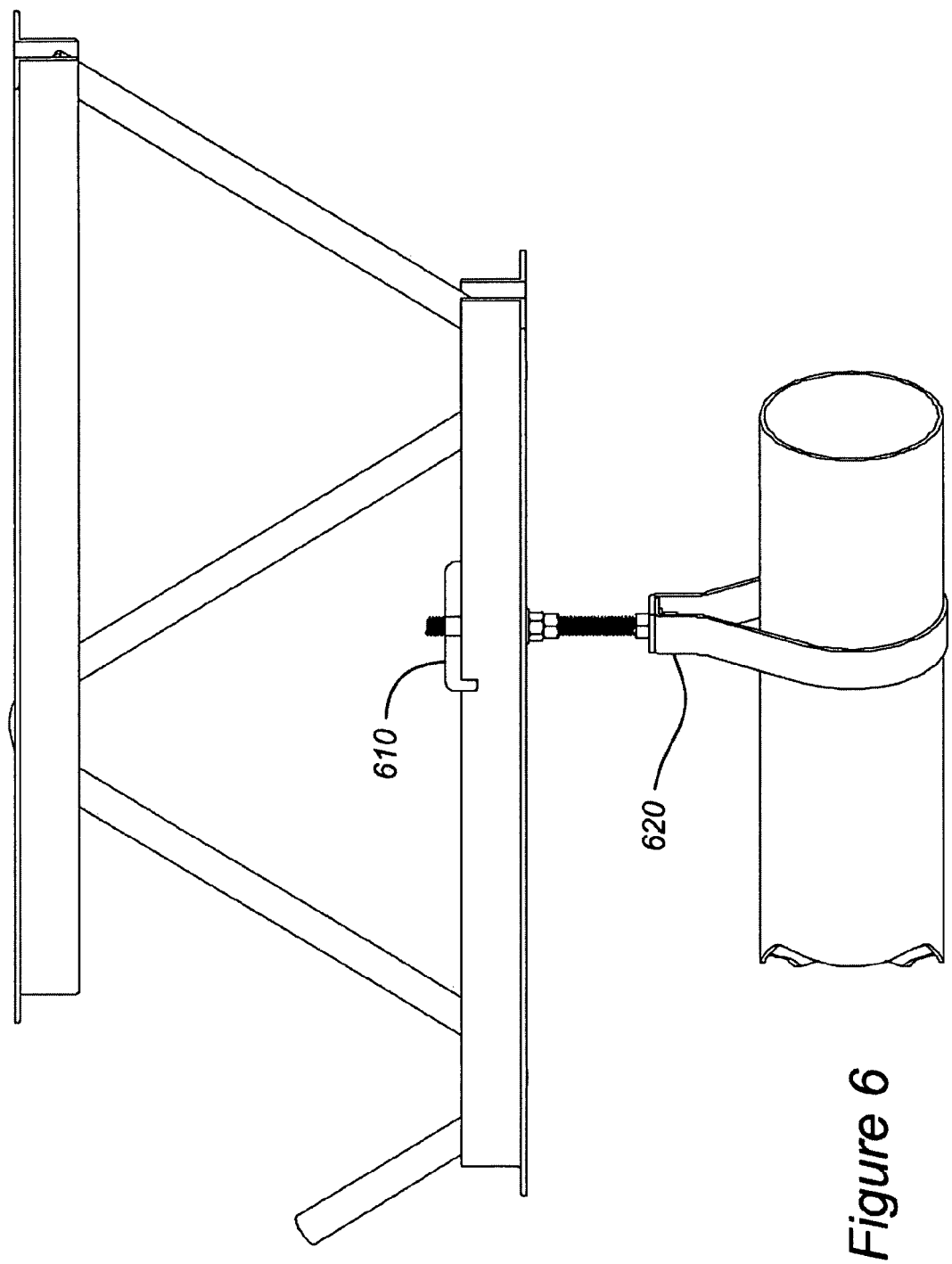

FIG. 6 presents another hanger assembly.

Figure 7:
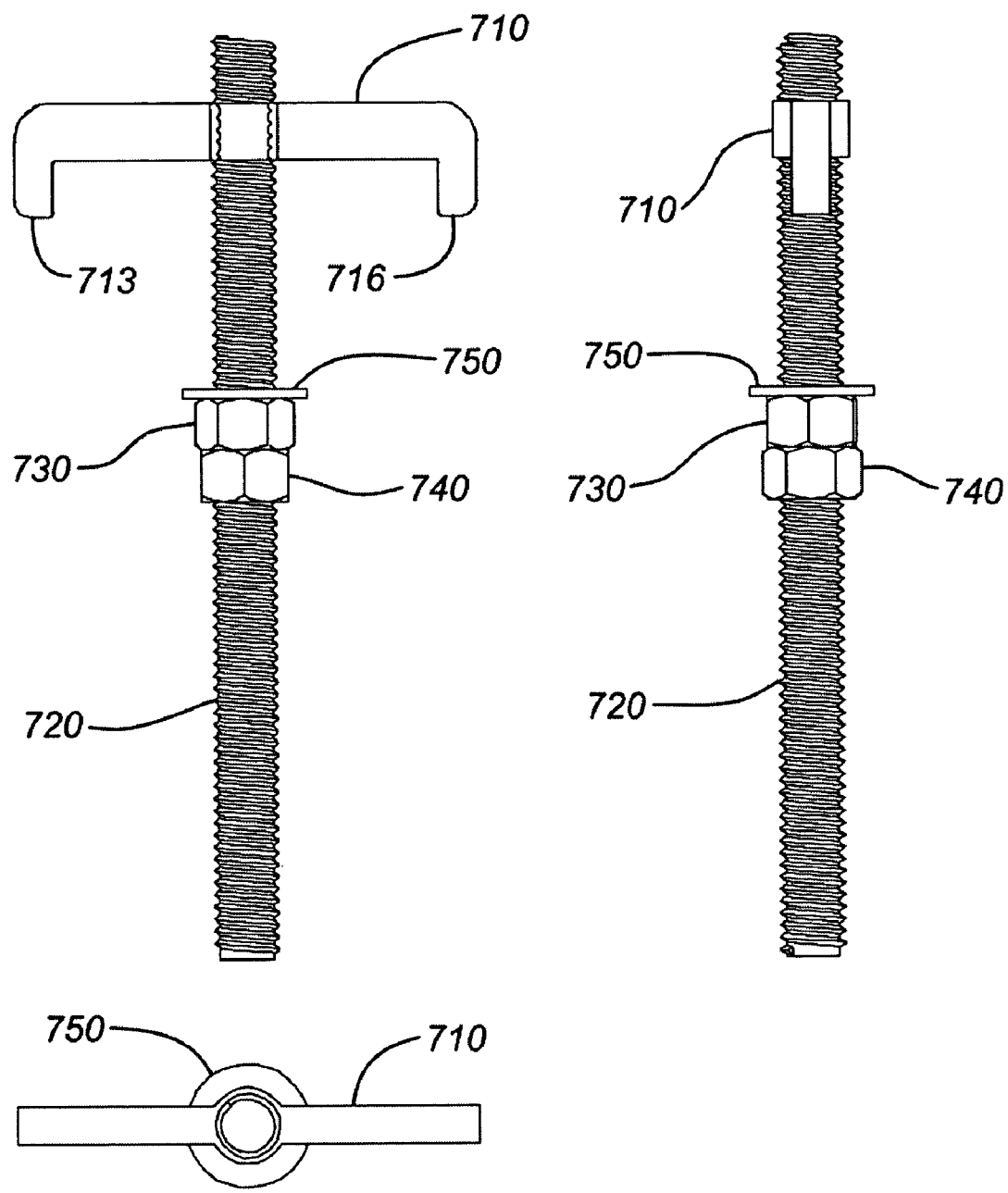

FIG. 7 presents another T-bar assembly.

Figure 8:
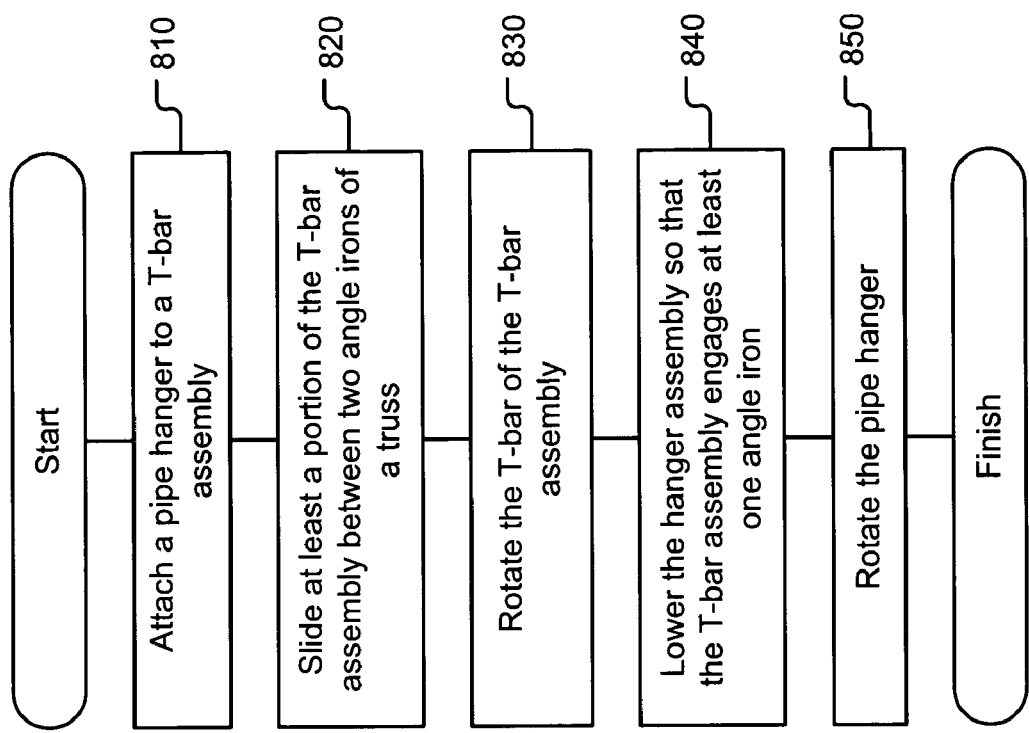

FIG. 8 presents another method of installing a hanger assembly onto a truss.

5. DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

5.1 One Embodiment of an Industrial Hanger Assembly

One embodiment of the invention is the industrial hanger assembly shown in FIG. 2. An exploded view of this industrial hanger assembly is shown in FIG. 3. As shown in FIG. 2, the industrial hanger assembly includes a T-bar assembly 210. A more detailed drawing of the T-bar assembly 210 is shown in FIG. 4.

As shown in FIG. 4, one embodiment of the T-bar assembly includes a T-bar 410. In some embodiments of the invention, the T-bar 410 contains two tabs 413 and 416. The two tabs 413 and 416 are typically configured so that they can engage the outer vertical surfaces of the lower angle irons of a truss. As a result, the two tabs 413 and 416 can rotationally restrain the T-bar assembly with respect to a truss, such as the truss shown in FIG. 2. The thickness of the T-bar 410 is typically configured so that the T-bar 410 can fit between the inner vertical surfaces of the lower angle irons in a truss. The T-bar 410 can be formed from a number of materials. For example, the T-bar 410 could be formed from steel, aluminum, nylon, or plastic.

The T-bar assembly shown in FIG. 4 also includes a threaded rod 420. In some embodiments of the invention, the threaded rod 420 is a low carbon steel all-thread rod. In some embodiments of the invention, the threaded rod 420 includes an ANSI thread while in other embodiments of the invention the threaded rod 420 includes a metric thread. The threaded rod 420 is configured so that it can fit between the inner vertical surfaces of the lower angle irons in a truss. Like the T-bar 410, the threaded rod 420 can be formed from a number of materials such as steel, aluminum, nylon, or plastic.

As shown in FIG. 4, the threaded rod 420 is attached to the T-bar 410. For example, if the T-bar 410 is formed from a steel plate and contains a cutout and the threaded rod 420 is formed from steel, then they could be attached by welds (not shown). Alternatively, if the threaded rod 420 is slotted to accept a portion of the T-bar 410, the T-bar 410 and the threaded rod 420 could be attached by a fastener, such as a bolt, screw or pin (not shown). If the T-bar 410 and the threaded rod 420 are both formed from plastic, then they could be molded as a single part.

Referring again to FIG. 2, the industrial hanger assembly includes a T-bar coupling 220. The top portion of the T-bar coupling 220 contains a thread that engages the thread on the T-bar assembly 210. Thus, by rotating the T-bar coupling 220 with respect to the T-bar assembly 210, the distance between the two parts can be easily increased or decreased. The outer diameter of the top portion of the T-bar coupling 220 is typically of sufficient size so that it will not fit between the inner vertical surfaces of the lower angle irons in a truss. For example, the outer diameter of the top portion of the T-bar coupling 220 may be 1 inch. The lower portion of the T-bar coupling 220 is adapted to interface with conventional items that are typically hung from trusses. The lower portion of the T-bar coupling 220 may interface with pipes, electrical junction boxes, lighting fixtures, conduit hangers, etc. As an example, the lower portion of the T-bar coupling 220 shown in FIG. 2 includes pipe threads that can interface with a pipe.

Referring again to FIG. 2, the industrial hanger assembly also includes conventional pipes 230, 250, and 270, conventional electrical junction boxes 240 and 260, and a lighting fixture 280.

5.2 A Method of Installing an Industrial Hanger Assembly

There are several methods of attaching the industrial hanger assembly shown in FIG. 3 to a truss. One method of attaching the industrial hanger assembly is presented in FIG. 5. First, as shown in Block 510, the lighting fixture 380 is conventionally attached to a first pipe 370. Next, as shown in Block 520 the first pipe 370 is then conventionally attached to a first electrical junction box 360. Then, as shown in Block 530, the first electrical junction box 360 is conventionally attached to a second pipe 350. As shown in Block 540, the second pipe 350 is then conventionally attached to a second electrical junction box 340. Next, as shown in Block 550, the second electrical junction box 340 is conventionally attached to a third pipe 330. Then, as shown in Block 560, the third pipe 330 is connected to a T-bar coupling 320 by engaging the pipe thread on the lower portion of the T-bar coupling 320 with the pipe thread on the upper portion of the third pipe 330 and then rotating the T-bar coupling 320 with respect to the third pipe 330. Next, as shown in Block 570, the thread of the T-bar assembly 310 is connected to the T-bar coupling 320 by engaging the threads of the two parts and by rotating the T-bar assembly 310 with respect to the T-bar coupling 320. After a few rotations of the T-bar assembly 310, the T-bar assembly 310 will be attached to the T-bar coupling 320. However, the vertical distance between the top surface of the T-bar coupling 320, and the tabs of the T-bar assembly 310 will be greater than the height of the angle irons in the lower portion of the truss.

Next, as shown in Block 580, the industrial hanger assembly is positioned so that at least a portion of the T-bar assembly 310 slides between the two angle irons in the lower portion of the truss. Then, as shown in Block 590, the T-bar assembly 310 is rotated approximately 90 degrees, which can be accomplished by rotating the lighting fixture 380 by 90 degrees. Next, as also shown in Block 590, the industrial hanger assembly is lowered so that the T-bar of the T-bar assembly 310 engages the top surfaces of the angle irons in the lower portion of the truss. Then, as shown in Block 595, the lighting fixture 380 is rotated. This rotation causes the T-bar assembly 310 to rotate until at least one of the tabs of the T-bar assembly 310 engages the outer surfaces of at least one of the lower angle irons in the lower portion of the truss. As the lighting fixture 380 is continually rotated, the T-bar coupling 320 will increase in height until the upper surface of the T-bar coupling 320 engages the lower surface of at least one of the angle irons that form the lower portion of the truss. At this time, the industrial hanger assembly is securely attached to the truss.

As is evident in the above description, an installer can safely install the industrial hanger assembly shown in FIG. 3 without having to be elevated to the height of the truss.

5.3 A Second Embodiment of an Industrial Hanger Assembly

A second embodiment of an industrial hanger assembly is shown in FIG. 6. This industrial hanger assembly includes a T-bar assembly 610. A more detailed drawing of T-bar assembly 610 is shown in FIG. 7.

As shown in FIG. 7, one embodiment of the T-bar assembly includes a T-bar 710. In some embodiments of the invention, the T-bar 710 includes two tabs, 713 and 716. The two tabs 713 and 716 are typically configured so that they can engage the outer vertical surfaces of the lower angle irons of a truss. As a result, the two tabs 713 and 716 can rotationally restrain the T-bar with respect to a truss, such as the truss shown in FIG. 6. The thickness of the T-bar 710 is typically configured so that the T-bar 710 can fit between the inner vertical surfaces of the lower angle irons in a truss. The T-bar 710 shown in FIG. 7 contains a thread that is intended to interface with an all-thread rod 720. This thread can be ANSI or metric or any other suitable thread. The T-bar 710 can be formed from a number of materials. For example, the T-bar 710 could be formed from steel, aluminum, nylon, or plastic.

The T-bar assembly shown in FIG. 7 also includes a threaded rod 720. In some embodiments of the invention, the threaded rod 720 is a low carbon steel all-thread rod. In some embodiments of the invention, the threaded rod 720 includes an ANSI thread while in other embodiments of the invention the threaded rod 720 includes a metric thread. The threaded rod 720 is configured so that it can fit between the inner vertical surfaces of the lower angle irons in a truss. Like the T-bar 710, the threaded rod 720 can be formed from a number of materials such as steel, aluminum, nylon, or plastic.

As shown in FIG. 7, the all-thread rod 720 can be attached to the T-bar 710 by engaging the threads of the two parts and by rotating the T-bar 710 with respect to the all-thread rod 720.

The T-bar assembly shown in FIG. 7 also includes two nuts 730 and 740 and a washer 750. The two nuts 730 and 740 may be utilized to set the lowermost position of the washer 750, which in some embodiments of the invention is a lock-washer, with respect to the all-thread rod 720. Other embodiments of the T-bar assembly can utilize a single nut that is restrained from rotating with respect to the all-thread rod, such as by a weld or by lock-tight. Still other embodiments of the T-bar assembly secure the lowermost position of the washer 750 by welding the washer to the all-thread rod. The washer 750 is typically of sufficient size so that it will not fit between the inner vertical surfaces of the lower angle irons in a truss.

Referring again to FIG. 6, the T-bar assembly 610 is attached to a pipe hanger 620. The pipe hanger 620 can be attached to the T-bar assembly 610 by using conventional methods such as nuts, as shown in FIG. 6.

5.4 A Second Method of Installing an Industrial Hanger Assembly

There are several methods of attaching the industrial hanger assembly shown in FIG. 6 to a truss. One method of attaching the industrial hanger assembly is presented in FIG. 8. First, as shown in Block 810, the pipe hanger 620 is attached to the T-bar assembly 610. For example, two nuts could be utilized to attach the pipe hanger 620 to the T-bar assembly 610. Next, as shown in Block 820, the industrial hanger assembly is positioned so that at least a portion of the T-bar assembly 610 slides between the two angle irons in the lower portion of the truss. Then, as shown in Block 830, the T-bar of the T-bar assembly 610 is rotated approximately 90 degrees, which can be accomplished by rotating the pipe hanger 620 by 90 degrees. Next as is shown in Block 840, the industrial hanger assembly is lowered so that the T-bar of the T-bar assembly 610 engages the top surfaces of the angle irons in the lower portion of the truss. Then, as shown in Block 850, the pipe hanger 620 is rotated. This rotation causes the T-bar of the T-bar assembly 610 to rotate until at least one of the tabs of the T-bar assembly 610 engages the outer surfaces of at least one of the lower angle irons in the lower portion of the truss. As the pipe hanger 620 is continually rotated, the all-thread rod of the T-bar assembly 610 will continue to rotate but the T-bar of the T-bar assembly 610 will not rotate because one or more tabs of the T-bar assembly 610 are in contact with the truss. Thus, the all-thread rod will increase in height until the washer of the T-bar assembly 610 contacts the lower surface of at least one angle iron of the truss. At this time, the industrial hanger assembly is securely attached to the truss.

As is evident in the above description, an installer can safely install the hanger assembly shown in FIG. 6 without having to be elevated to the height of the truss.

5.5 Conclusion

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. For example, the above T-bar assemblies include T-bars with tabs. However, some T-bars utilize other devices to inhibit rotation with respect to a truss. One such device is a slot in the T-bar that is of sufficient size to enable a portion of the angle iron to fit within the slot. Another such device is an extended flange that contacts the webbing of the truss when rotated. All that is required of a T-bar is that a portion of the T-bar can fit between the angle irons of a truss, that the T-bar will contact a portion of the truss when rotated thereby prohibiting rotation with respect to the truss, and that the T-bar will support items to be hung from the truss.

As another example, the above-described T-bar assemblies include a threaded rod with threads along the entire length of the rod. However, such threads need not be along the entire length of the rod. In addition, other T-bar assemblies could utilize tubes instead of rods. Further, some embodiments of the invention need not utilize threads at all.

As still another example, the above-described T-bar coupling includes an internal pipe thread for coupling to a pipe. However, other embodiments of the invention may utilize external threads to couple directly to an electrical junction box, or a light fixture.

Additionally, the above disclosure is not intended to limit the present invention. The scope of the present invention is defined by the appended claims.

It is claimed:

1. A hanger assembly comprising:
a) a truss having a first angle iron and a second angle iron, the first angle iron having an upper surface, a lower surface, an inner surface, and an outer surface, the second angle iron having an upper surface, a lower surface, an inner surface, and an outer surface, the truss having webbing connected to the inner surface of the first angle iron and the inner surface of the second angle iron and having a gap between the inner surface of the first angle iron and the inner surface of the second angle iron the gap having a gap dimension, the truss being configured so that the upper surface of the first angle iron has the highest elevation of any surface of the first angle iron and the upper surface of the second angle iron has the highest elevation of any surface of the second angle iron, the truss being configured so that the lower surface of the first angle iron has the lowest elevation of any surface of the first angle iron and the lower surface of the second angle iron has the lowest elevation of any surface of the second angle iron;

b) a first member, a portion of which is operable to pass completely through the gap between the inner surface of the first angle iron and the inner surface of the second angle iron and contacting the upper surface of at least one of the first angle iron or the second angle iron and contacting the outer surface of at least one of the first angle iron or the second angle iron, the first member having a first dimension that is less than the gap dimension and a second dimension greater than the gap dimension; and c) a second member coupled to the first member, the second member contacting the lower surface of at least one of the first angle iron or the second angle iron, wherein the second member is coupled to the first member when the portion of the first member is positioned with the first dimension parallel to the gap and is passed through the gap between the angle irons and the first member is rotated so that the first dimension is non-parallel to the gap such that the first member is supported from the upper surface of the first angle iron and the upper surface of the second angle iron, and is held in place by contact of the second member with the lower surface of the first or second angle iron.

2. The hanger assembly of claim 1, wherein the first member includes a tab contacting the outer surface of either the first angle iron or the second angle iron.

3. The hanger assembly of claim 1, wherein the first member includes a first tab contacting the outer surface of the first angle iron and a second tab contacting the outer surface of the second angle iron.

4. The hanger assembly of claim 1, wherein the first member includes a slot that receives at least a portion of the first angle iron.

5. The hanger assembly of claim 1, wherein the first member includes a first slot that receives at least a portion of the first angle iron and a second slot that receives at least a portion of the second angle iron.

6. The hanger assembly of claim 1, wherein the second member is coupled to the first member via a rod, at least a portion of which is threaded.

7. The hanger assembly of claim 1, wherein the second member is coupled to the first member via an all-thread rod.

8. The hanger assembly of claim 1, wherein the second member is coupled to the first member via an all-thread rod that is welded to the first member.

9. The hanger assembly of claim 1, wherein the second member is not operable to fit within the gap between the inner surface of the first angle iron and the inner surface of the second angle iron.

10. The hanger assembly of claim 1, wherein the second member includes a thread for engaging a threaded rod that is coupled to the first member.

11. The hanger assembly of claim 1, wherein the second member includes a first thread for engaging a threaded rod that is coupled to the first member and a second thread for engaging a pipe.

12. The hanger assembly of claim 1, wherein the second member includes an ANSI thread and a pipe thread.

13. The hanger assembly of claim 1, wherein at least a portion of the first member is formed from a steel plate.

14. The hanger assembly of claim 1, wherein the second member is operable to support at least one of an electrical junction box, a light fixture, and a pipe hanger.

15. A hanger assembly comprising:
a) a truss having a first angle iron and a second angle iron, the first angle iron having an upper surface, a lower surface, an inner surface, and an outer surface, the second angle iron having an upper surface, a lower surface, an inner surface, and an outer surface, the truss having a gap between the inner surface of the first angle iron and the inner surface of the second angle iron, the truss being configured so that the upper surface of the first angle iron has the highest elevation of any surface of the first angle iron and the upper surface of the second angle iron has the highest elevation of any surface of the second angle iron, the truss being configured so that the lower surface of the first angle iron has the lowest elevation of any surface of the first angle iron and the lower surface of the second angle iron has the lowest elevation of any surface of the second angle iron;
b) a first member having a bottom surface; and
c) a second member having a top surface, the second member being coupled to the first member such that the bottom surface of the first member is substantially parallel to the top surface of the second member, wherein while coupled, the first member is operable to pass completely through the gap between the inner surface of the first angle iron and the inner surface of the second angle iron, the bottom surface of the first member is operable to contact the upper surface of at least one of the first angle iron or the second angle iron, a portion of the first member is operable to contact the outer surface of at least one of the first angle iron or the second angle iron, and the top surface of the second member is operable contact the lower surface of at least one of the first angle iron or the second angle iron.

16. The hanger assembly of claim 15 including a threaded member connecting the first and second members to one another.

17. The hanger assembly of claim 15 including an engaging element on the first member for engaging the outer surface of the first or second angle iron.

18. The hanger assembly of claim 16 wherein the threaded member is fixedly connected to the first member.

19. The hanger assembly of claim 18 wherein the second member threads onto the threaded member.

* * * * *

UNITED STATES PATENT AND TRADEMARK OFFICE
CERTIFICATE OF CORRECTION

| | | |
|---|---|---|
| PATENT NO. | : 7,410,140 B2 | Page 1 of 1 |
| APPLICATION NO. | : 10/641603 | |
| DATED | : August 12, 2008 | |
| INVENTOR(S) | : Sam K. Hartwick | |

It is certified that error appears in the above-identified patent and that said Letters Patent is hereby corrected as shown below:

Claim 15, column 7, lines 9-10 should read: --...and the top surface of the second member is operable to contact the lower surface of at least one of the first angle...--

Signed and Sealed this

Seventh Day of October, 2008

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,410,140 B2 | Page 1 of 1 |
| APPLICATION NO. | : 10/641603 | |
| DATED | : August 12, 2008 | |
| INVENTOR(S) | : Sam K. Hartwick | |

It is certified that error appears in the above-identified patent and that said Letters Patent is hereby corrected as shown below:

On the title page, please remove the following:

(73) Assignee: Illinois Tool Works Inc., Glenview, IL (US)

Signed and Sealed this

Fourteenth Day of April, 2009

JOHN DOLL
*Acting Director of the United States Patent and Trademark Office*